United States Patent Office 2,784,137
Patented Mar. 5, 1957

2,784,137

HALOACETYLBENZENESULFONAZIDES AND USE THEREOF

Walter A. Gregory, Wilmington, Del., assignor to E. I. du Pont de Nemours and Company, Wilmington, Del., a corporation of Delaware No Drawing. Application May 20, 1955,
Serial No. 510,056

7 Claims. (Cl. 167—30)

This invention relates to haloacetylarylsulfonyl azides and fluorides.

This application is a continuation-in-part of my copending application Serial No. 431,291, filed May 20, 1954, now abandoned, which in turn is a continuation-in-part of U. S. Patent No. 2,680,134, filed July 2, 1952.

The compounds of the present invention can be represented by the formula

1.

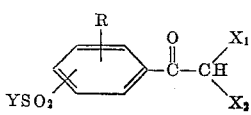

where R represents hydrogen, halogen, lower alkyl or lower alkoxyl radicals, Y is fluorine or azido group, $X_1$ is a halogen of the class consisting of chlorine, bromine and iodine, and $X_2$ is a member of the group consisting of hydrogen, chlorine, bromine and iodine.

By the terms "lower alkyl" and "lower alkoxy" I mean to include all alkyl and alkoxy radicals containing up to but not exceeding 6 carbon atoms.

The compounds of Formula 1 wherein Y is azido can be prepared from acetylbenzenesulfonyl fluorides or chlorides as shown in the following diagram:

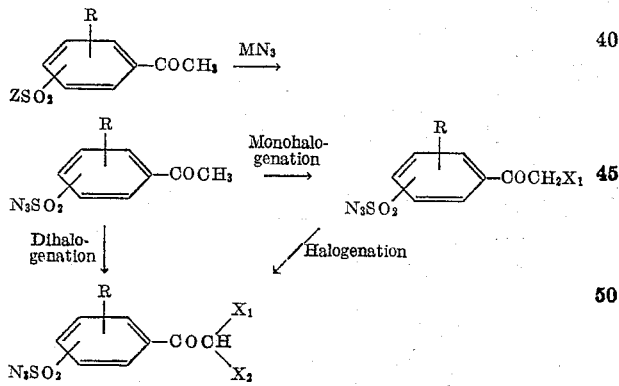

In the above diagram R, $X_1$ and $X_2$ have the same significance as in Formula 1. Z represents chlorine or fluorine, and M represents an alkali metal, preferably sodium.

Reaction between the metal azide and acetophenone is effected in an inert solvent, having good solubility properties for the reactants; such as for instance, dimethylformamide, dimethylacetamide, acetonitrile, or tetramethylurea. Of these I preferred to use dimethylformamide. The reaction is exothermic. The temperature of the reaction mixture should not be allowed to exceed 100° C. nor should it be cooled below 0° C. Preferably the reaction between the metal azide and acetophenone is carried out at room temperature (20–30° C.) and is completed in 10 to 20 hours. The reaction period may, however, vary from about 1 hour to several days depending on the reaction temperature.

The resulting azide is isolated by dumping the reaction mixture into water and in most instances the product may be halogenated without further purification. Higher yields are usually obtained using fluorides (Z=F).

Monohalogenation of the acetylarylsulfonyl azides is effected at a moderate temperature, say, 16–100° C. either in a slurry or in a solution. Included among the variety of media which may be employed are acetic acid, chloroform and carbon tetrachloride. Of the three specifically named, chloroform is the preferred solvent for bromination while in the case of chlorination glacial acetic acid is preferred. Inasmuch as the unhalogenated azide is not very soluble in cold glacial acetic acid, the halogenation may be difficult to start at room temperature. In some instances the temperature of the reactants must be raised to 60° or 70° C. Preferably, monohalogenation is carried out in the temperature range of 20° to 30° C.

The resulting alpha-haloacetophenone derivative can be isolated from a solvent medium by distilling off the solvent. In the event that glacial acetic acid is employed as the reaction medium, the monohalogenated product can be isolated by dumping the reaction mixture into water whereupon the desired product separates as an oil or a crystalline compound.

The dihalogenation step is effected in glacial acetic acid and at a temperature of from 50 to 118° C. preferably 60–75° C. When starting with the unhalogenated acetylarylsulfonyl azide, two equivalents of halogen must be used. It will be understood that if it is desired to convert the monohalogenated product to the dihalo substituted acetophenone, one molar equivalent of halogen is employed. The dihalo product separates as an oil or as crystals when the reaction mixture is poured into water.

The haloacetylarylsulfonyl fluorides can be prepared as described above for the azides either from the unhalogenated fluorosulfonyl acetophenone using two equivalents of halogen, or from the monohalogenated fluorosulfonylacetophenone using one equivalent of halogen.

One of the methods for the production of the fluorosulfonylphenacyl halides of Formula 1 can be diagrammatically represented as follows:

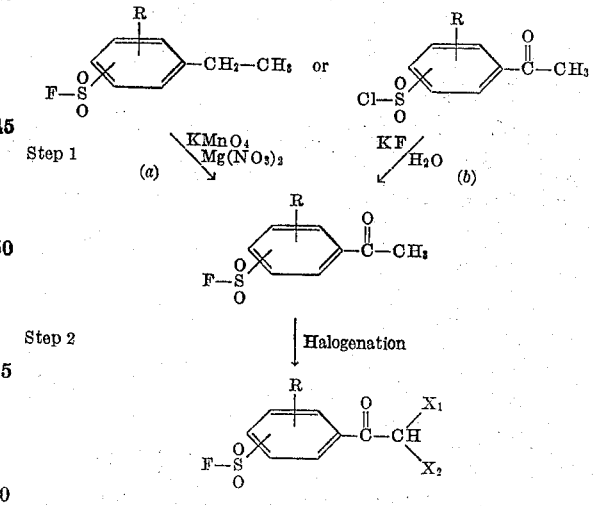

where R, $X_1$ and $X_2$ have the same significance as in Formula 1.

Step 1 of the above-outlined process involves preparing a compound of the formula

2.

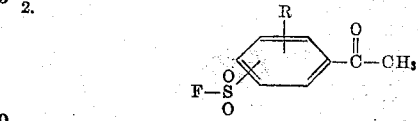

where R has the same significance as in Formula 1. The preparation of the above-shown substituted acetophenone can be accomplished by at least two different routes as will be apparent by reference to Steps 1a and 1b of the process diagram already shown.

If substep (a) is to be followed, the starting material is a substituted benzenesulfonyl fluoride of the formula

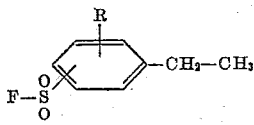

The fluoride is mixed with potassium permanganate and magnesium nitrate hexahydrate to yield the desired substituted acetophenone. It is preferred to add an acetone solution of the fluoride to an aqueous system containing the magnesium nitrate and potassium permanganate.

An alternative route of preparing a compound of Formula 2 involves reacting potassium bifluoride or potassium fluoride in aqueous medium with a compound of the formula

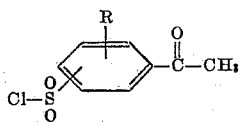

The product of Step 1 (Formula 2) is halogenated in Step 2 to give a phenacyl halide of the formula

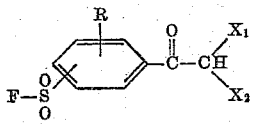

Halogenation of the acetylarylsulfonyl fluorides can be carried out in a variety of ways as already described for the corresponding azides.

The compounds of the present invention are useful in the preparation of other organic compounds, such as for instance the fluorosulfonylphenylamido-1,3-propanediols of my parent case U. S. Patent No. 2,680,134. The compounds are useful as antifungal agents, particularly against early blight of tomatoes (*Alternaria solani*). They also possess antibacterial activity against a variety of microorganisms and herbicidal activity against Salvinia, a genus of fern allies of wide distribution, including floating moss. The compounds of the invention can be reacted with polyhydric compounds or polyamines to give useful polymers.

In order to more fully understand the invention, reference should be had to the following illustrative examples:

*Example 1.—p-(bromoacetyl)benzenesulfonyl azide* p-acetylbenzenesulfonyl azide is prepared as follows: 40.4 g. (0.2 mole) of p-acetylbenzenesulfonyl fluoride and 19.5 g. (0.3 mole) of sodium azide are slurried in 150 ml. of redistilled dimethylformamide at room temperature for a period of about 12 hours. The reaction mixture is then poured into 800 ml. of water and stirred for 30 minutes. The crystalline product is filtered off. (M. P. 98–100° C.) The yield is quantitative.

45 g. (0.2 mole) of p-acetylbenzenesulfonyl azide, prepared as described above, are dissolved in 500 ml. of chloroform. 32 g. (0.2 mole) of bromine are added dropwise through a dropping funnel. Care is taken to avoid at any time a large excess of bromine in the reaction mixture. If this precaution is not taken, the final product is contaminated with dibromo compound, rendering the purification costly and tedious. The reaction is usually rather difficult to start. A number of procedures may be used to facilitate starting, such as adding a few drops of hydrobromic acid or of acetyl bromide, or starting the bromination on a small scale in a test tube by boiling a solution of the substituted acetophenone in chloroform with one or two drops of bromine. When the reaction mixture starts to decolorize, the reaction mixture is poured into the main solution.

When the bromination has started, bromine is introduced into the reaction vessel as fast as it will react, the temperature of the reaction mixture being maintained between 15 and 30° C. by external cooling. The reaction mixture is then left standing for a few hours. A stream of nitrogen is passed through to get rid of the hydrobromic acid. The chloroform is eventually evaporated off and the residue slurried with ethyl ether to give 30 g. (75% yield) of crude p-(bromoacetyl)benzenesulfonyl azide, M. P. 75–79° C. After recrystallization from 4 parts of carbon tetrachloride the product melts at 77–78° C. It has the following chemical structure:

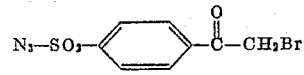

Calc'd. for $C_8H_6O_3N_3BrS$: C, 32.8; H, 1.97; N, 13.82; Br. 26.4. Found: C, 31.98; H, 2.29; N, 13.93; Br. 27.08.

In a tube dilution test, p-(bromoacetyl)benzenesulfonyl azide inhibits *Salmonella typhimurium* and *Pseudomonas aeruginosa* at 200 gamma/ml., *Candida albicans* at 100 gamma/ml. and *Micrococcus pyogenus* var. *aureus* at 50 gamma/ml.

The compound gives complete control (0% disease) of early blight (*Alternaria solani*) on tomato foliage at a concentration of 0.2%. At a concentration of 0.016%, there is about 41% disease. To determine the percent disease lesion counts are made after a suitable incubation period following exposure to the early blight fungus.

*Example 2.—p-(Dibromoacetyl)benzenesulfonyl azide*

Thirty and four tenths grams of p-(bromoacetyl)benzenesulfonyl azide prepared as in Example 1 are dissolved in 100 ml. of glacial acetic acid maintained between 50 and 60° C. Sixteen grams of bromine are added dropwise through a funnel as fast as reaction occurs. When the bromine addition is completed the reaction mixture is cooled to room temperature and is poured into 750 ml. of water. The product which separates crystallizes upon standing. It is filtered off and washed with water and dried to give 33 g. of product melting at 109–116° C. After crystallization from 10 parts of carbon tetrachloride, the p-(dibromoacetyl)benzenesulfonyl azide melts at 120–121° C. An analytical sample recrystallized once more from carbon tetrachloride melts at 121.5–123° C. The structure of this dibromo derivative is as follows:

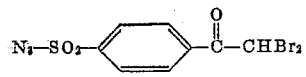

Calc'd for $C_8H_5O_3N_3Br_2S$: C, 25.1; N, 10.98; Br, 41.7. Found: C, 25.19; N, 11.10; Br, 42.99.

In a standardized in vitro test, p-(dibromoacetyl)benzenesulfonyl azide inhibits *Streptococcus agalactiae*, *Micrococcus pyogenes* var. *aureus* and *Candida albicans* at 50 gamma/ml.; *Salmonella typhimurium* and *Pseudomonas aeruginosa* at 100 gamma/ml. and 200 gamma/ml., respectively.

The compound gives a complete control (0% disease) of early blight (*Alternaria solani*) on tomato foliage at a concentration of 0.2%.

The compound of this example completely kills Salvinia plants at a concentration of 10 p. p. m.

*Example 3.—p-(Chloroacetyl)benzenesulfonyl azide*

Twenty-two and five tenths grams of p-acetylbenzenesulfonyl azide prepared as in Example 1 are dissolved in 250 ml. of glacial acetic acid maintained between 50 and 75° C. Seven grams of chlorine are introduced below the surface of the reaction mixture with stirring. When the chlorine addition is completed, the reaction mixture is cooled down to room temperature and poured into 1 liter of water. The desired product, p-(chloroacetyl)benzenesulfonyl azide, crystallizes out, is collected and dried (18 g., M. P. 69–73.5° C.). After recrystallization from 3 parts of carbon tetrachloride, the product melts at 75–76° C. An analytical sample recrystallized once more from carbon tetrachloride melts at 76.5–77° C. p-(Chloroacetyl)benezenesulfonyl azide has the formula:

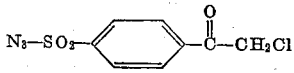

Calc'd for $C_8H_6O_3N_3SCl$: C, 37.02; H, 2.32; N, 16.24; Cl, 13.67. Found: C, 37.23; H, 2.47; N, 16.72; Cl, 14.37.

p-(Chloroacetyl)benzensulfonyl azide gives complete control (0% disease) of early blight (*Alternaria solani*) on tomato foliage at a concentration of 0.2%. It completely kills Salvinia plants at a concentration of 10 p. p. m.

*Example 4.—p-(Dichloroacetyl)benzenesulfonyl azide* p-(Acetyl)benzenesulfonyl azide (22.5 grams) is reacted with 14 grams of chlorine as described in Example 3. The product is obtained in a 77% yield (22.6 g. M. P. 77–78.5°). After recrystallization from 4 parts of carbon tetrachloride the melting point of the product is 81–82° C. The chemical structure of p-(dichloroacetyl)-benzenesulfonyl azide is as follows:

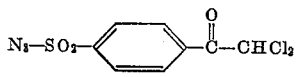

Calc'd for $C_8H_5O_3N_3Cl_2S$: Cl, 24.1; N, 14.3. Found: Cl, 24.15; N, 14.31.

The compound of this example gives complete control (0% disease) of early blight (*Alternaria solani*) on tomato foliage at a concentration of 0.2%.

*Example 5.—p-(Bromoacetyl)benzenesulfonyl fluoride*

A solution of 400 g. of p-ethylbenzenesulfonyl fluoride in 1.15 liters of acetone is added to 2.3 liters of distilled water containing 778 g. of magnesium nitrate hexahydrate and 327 g. of potassim permanganate. The mixture is heated to a temperature of 50° C. During the heating period, the mixture is stirred. At the end of 2.5 hours, 163 g. of potassium permanganate is added and the reaction is allowed to continue for a period of 3.5 hours. The excess permanganate is removed by adding slowly to the reaction mixture a saturated solution of sodium sulfite until the purple color of the mixture is discharged. The mixture is filtered with the aid of diatomaceous earth to insure removal of manganese dioxide. The filter cake is collected and washed with acetone and benzene.

The washed product is extracted from the aqueous acetone filtrate with benzene. The solvents are removed from the extract containing the desired product by distillation at atmospheric pressure. The product itself is fractionated through a packed column to give a 94 g. yield. 263 g. of starting material is recovered. The product is crystallized from 600 cc. of Skellysolve C to give 91 g. of material melting 177–178.5° C. The product, p-fluorosulfonylacetophenone, has the formula

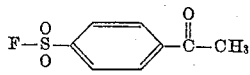

To a stirred solution of 202.2 g. of p-fluorosulfonyl-acetophenone in 700 cc. of glacial acetic acid there is added slowly 159.8 g. of bromine. After the first 15 drops of bromine are added, a period of about 13 minutes elapses before the bromine is decolorized. The bromination is continued at such a rate that the reaction temperature is maintained at or below 30° C. Crystals separate from the reaction mixture towards the end of the bromination. The resulting slurry is poured into 3 liters of ice and water. The white crystals are filtered, collected and dried. The yield is 257 g. of product having a melting range of from 103 to 108.5° C. This crude product is crystallized from 400 cc. of benzene to give 188 g. of material, M. P. 108–110° C. A further quantity of product can be obtained by recrystallizing the residue obtained from the benzene filtrate. The product of this reaction is p-(bromoacetyl)benzenesulfonyl fluoride, whose formula is as follows:

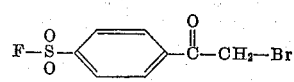

*Analysis.*—Calcd. for $C_8H_6BrFO_3S$: C, 34.18; H, 2.15; Br, 28.43. Found: C, 34.30; H, 2.27; Br, 28.32.

p-(Bromoacetyl)benzenesulfonyl fluoride is useful as a fungicide. It gives complete control (0% disease) of early blight (*Alternaria solani*) on tomato foliage at a concentration of 0.2% and at a concentration of 0.016% there was only 5% disease.

*Example 6.—p-(Dibromoacetyl)benzenesulfonyl fluoride*

Twenty-nine grams of p-(bromoacetyl)benzenesulfonyl fluoride prepared as in Example 5 are treated with 16 g. of bromine in 100 ml. of glacial acetic acid in a manner similar to the one described in Example 2. Twenty-eight grams of product are obtained, melting at 78.5–80° C. After recrystallizing the crude p-(dibromo)benzenesulfonyl fluoride from carbon tetrachloride, it melts at 85.5–86.5° C. Its structural formula is as follows:

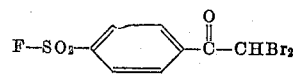

Calc'd. for $C_8H_5O_3Br_2FS$: C, 26.65; H, 1.39; S, 8.87. Found: C, 26.33; H, 1.57; S, 6.92.

This compound in in vitro tests causes complete inhibition of *Salmonella typhimurium*, *Streptococcus agalactiae*, *Micrococcus pyogenes* var. *aureus*, and *Pseudomonas aeruginosa* at 250 gamma/ml. It also inhibits the fungus *Candida albicans* at 125 gamma/ml. Its fungicidal activity is shown by the fact that it gives complete control (0% disease) of early blight (*Alternaria solani*) on tomato foliage at a concentration of 0.2%. At a concentration of 0.016%, there is only 5% disease.

p-(Dibromoacetyl)benzenesulfonyl fluoride completely kills Salvinia plants at a concentration of 100 p. p. m. and gives severe injury at 10 p. p. m.

*Example 7.—m-(Bromoacetyl)benzenesulfonyl fluoride*

A mixture of acetophenone ortho and para sulfonic acid barium salts are prepared according to the procedure of Weston and Suter, J. Am. Chem. Soc. 61, 390 (1939). The barium salts are converted to the sodium salts by warming a water solution and adding an equivalent quantity of sodium sulfate, cooling the solution and filtering off the barium sulfate. The resulting aqueous solution is concentrated to dryness and the crystals are ground and dried in a vacuum oven at 100° C.

A portion of 111 g. of this sodium salt is suspended in 500 cc. of dimethylformamide and stirred at room temperature as 78 g. of thionyl chloride is added. After stirring for 30 minutes the mixture is poured into two liters of ice and water and the product extracted into methylene chloride. The methylene chloride extract is dried over calcium chloride, and the methylene chloride is removed by distillation. The residue is fractionated under reduced pressure to give two fractions. The smaller fraction is o-chlorosulfonylacetophenone and the larger fraction is m-chlorosulfonylacetophenone.

A 50 g. portion of m-chlorosulfonylacetophenone is added to a solution of 50 g. of potassium bifluoride in 100 cc. of water and the mixture is stirred well as it is warmed to 85–90° C. on a steam bath. The reaction is continued one hour and the mixture is cooled to room temperature. The product may be extracted from the aqueous phase with chloroform. The chloroform is distilled off and the product purified by distillation under reduced pressure.

The o-fluorosulfonylacetophenone is prepared from o-chlorosulfonylacetophenone by this same procedure.

A solution of 20.2 g. of m-fluorosulfonylacetophenone in 150 cc. of glacial acetic acid is stirred at 20° C. as 16 g. of bromine are slowly added. An induction period may be noted after the first few drops of bromine are added, and before the color fades from the solution. A few drops of acetyl bromide may be used to catalyze the reaction. After the bromination has started, the bromine is added over an hour and the resulting solution is stirred for an additional 30 minutes. The mixture is poured into 500 cc. of ice and water, and the product separates as a crystalline solid. This filtered and washed with water. It may be crystallized from benzene or cyclohexane. The product which is useful as a fungicide in controlling early blight of tomatoes may be represented by the formula $$\underset{SO_2-F}{\underset{|}{C_6H_4}}-\overset{O}{\underset{\|}{C}}-CH_2-Br$$

*Example 8.—m-(Dibromoacetyl)benzenesulfonyl fluoride*

A 29 gram portion of m-(bromoacetyl)benzenesulfonyl fluoride prepared in Example 7 is treated with 16 g. of bromine in 100 ml. of glacial acetic acid in the manner described in Example 2. The following product, active as a fungicide against *Alternaria solani*, is isolated:

$$\underset{F-SO_2}{\underset{|}{C_6H_4}}-\overset{O}{\underset{\|}{C}}-CHBr_2$$

*Example 9.—o-(Bromoacetyl)benzenesulfonyl fluoride*

The o-fluorosulfonylacetophenone is obtained as shown in Example 7. A solution of 20.2 g. of o-fluorosulfonyl-acetophenone is dissolved in 500 cc. of ethylene chloride and 7.5 g. of chlorine gas is bubbled slowly into the solution while it is stirred. The addition is made over two hours, and at the end the stirring is continued for one hour. The solution is evaporated under reduced pressure and the residue is distilled under reduced pressure. The product which has fungicidal activity has the following structural formula $$\underset{SO_2F}{\underset{|}{C_6H_4}}-\overset{O}{\underset{\|}{C}}-CH_2-Cl$$

*Example 10.—o-(Dibromoacetyl)benzenesulfonyl fluoride*

A 29 gram quantity of o-(bromoacetyl)benzenesulfonyl fluoride from Example 9 is treated with 16 g. of bromine in 100 ml. of glacial acetic acid as described in Example 2. The following product, o-(dibromoacetyl)benzenesufyonyl fluoride, is isolated:

$$\underset{F-SO_2}{\underset{|}{C_6H_4}}-\overset{O}{\underset{\|}{C}}-CHBr_2$$

The product is effective in controlling early blight when applied to tomato foliage.

*Example 11.—o-(Bromoacetyl)benzenesulfonyl azide* o-Acetylbenzenesulfonyl azide is prepared in an identical manner as the p-acetyl derivative in Example 1 except o-acetylbenzenesulfonyl fluoride is used in place of p-acetylbenzenesulfonyl fluoride. The o-acetyl compound is prepared as shown in Examples 7 and 9.

Forty-five grams of the o-acetylbenzenesulfonyl azide are dissolved in 500 ml. of chloroform and reacted with 32 g. of bromine in a manner analogous to that described in Example 1. The following product, having herbicidal activity against Salvinia plants at 100 p. p. m., is isolated:

$$\underset{N_3-SO_2}{\underset{|}{C_6H_4}}-\overset{O}{\underset{\|}{C}}-CH_2Br$$

*Example 12.—o-(Dibromoacetyl)benzenesulfonyl azide*

Thirty and four-tenths grams of o-(bromoacetyl)benzenesulfonyl azide prepared as in Example 11 are reacted with 16 g. of bromine in 100 ml. of glacial acetic acid in the manner described in Example 2. The following product is isolated:

$$\underset{N_3-SO_2}{\underset{|}{C_6H_4}}-\overset{O}{\underset{\|}{C}}-CHBr_2$$

It is useful as a herbicide and will kill Salvinia plants in concentrations of about 100 p. p. m.

*Example 13.—4-(chloroacetyl)-2-methoxybenzenesulfonyl fluoride*

4-acetyl-2-methoxybenzenesulfonyl fluoride is prepared as described for p-acetylbenzenesulfonyl fluoride in Example 5, except 4-ethyl-2-methoxybenzenesulfonyl fluoride is used instead of p-ethylbenzenesulfonyl fluoride.

Reaction between 23.2 grams of the 4-acetyl-2-methoxybenzenesulfonyl fluoride and 7 grams of chlorine is effected in 250 ml. of glacial acetic acid as described in Example 3. The following product is isolated from the reaction mixture:

$$F-SO_2-\underset{\underset{CH_3O}{|}}{C_6H_3}-\overset{O}{\underset{\|}{C}}-CH_2Cl$$

It is effective in controlling early blight (*Alternaria solani*) when applied to tomato foliage.

*Example 14.—4-(dichloroacetyl)-2-methoxybenzenesulfonyl fluoride*

Twenty-three and two-tenths grams of 4-acetyl-2-methoxybenzenesulfonyl fluoride, prepared as in Example 13, are mixed with 14 g. of chlorine in glacial acetic acid as described in Example 3. The resulting product, which has the formula shown below, $$F-SO_2-\underset{\underset{CH_3O}{|}}{C_6H_3}-\overset{O}{\underset{\|}{C}}-CHCl_2$$

is effective in controlling early blight when applied to tomato foliage.

*Example 15.—4-(chloroacetyl)-3-chlorobenzenesulfonyl azide*

4-acetyl-3-chlorobenzenesulfonyl azide is prepared in a manner as similar to that described in Example 1 for p-acetylbenzenesulfonyl azide except 4-acetyl-3-chlorobenzenesulfonyl fluoride is used in place of the p-acetyl benzenesulfonyl fluoride.

Twenty-six grams of 4-acetyl-3-chlorobenzenesulfonyl azide are reacted with 7 grams of chlorine in 250 ml. of glacial acetic acid as described in Example 3. The desired product, 4-(chloroacetyl)-3-chlorobenzenesulfonyl azide, is isolated from the reaction mixture. It has the following formula $$N_3-SO_2-\underset{\underset{Cl}{|}}{C_6H_3}-\overset{O}{\underset{\|}{C}}-CH_2Cl$$

The compound of the above formula will kill Salvinia plants in concentrations of less than 100 p. p. m.

*Example 16.—4-(dichloroacetyl)-3-chlorobenzenesulfonyl azide*

A 26 gram portion of 4-acetyl-3-chlorobenzenesulfonyl azide from Example 15 is reacted with 14 g. of chlorine as described in Example 3. The following product is isolated:

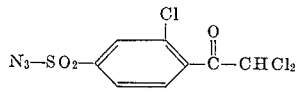

It is herbicidal and will kill Salvinia plants in concentrations of less than 100 p. p. m.

The following compounds are further examples of my haloacetylarylsulfonyl azides and fluorides. They can be prepared in accordance with procedures described above.

p-(Iodoacetyl)benzenesulfonyl fluoride
p-(Iodoacetyl)benzenesulfonyl azide
p-(Diiodoacetyl)benzenesulfonyl azide
m-(Chloroacetyl)benzenesulfonyl fluoride
m-(Dichloroacetyl)benzenesulfonyl azide
o-(Dichloroacetyl)benzenesulfonyl fluoride
o-(Iodoacetyl)benzenesulfonyl azide
4-(chloroacetyl)-2-chlorobenzenesulfonyl fluoride
4-(dichloroacetyl)-2-chlorobenzenesulfonyl azide
3-(bromoacetyl)-4-chlorobenzenesulfonyl azide
3-(dibromoacetyl)-4-bromobenzenesulfonyl fluoride
2-(iodoacetyl)-4-fluorobenzenesulfonyl fluoride
2-(diiodoacetyl)-4-fluorobenzenesulfonyl azide
4-(chloroacetyl)-2-toluenesulfonyl fluoride
4-(dibromoacetyl)-2-toluenesulfonyl fluoride
4-(dichloroacetyl)-2-toluenesulfonyl azide
4-(bromoacetyl)-2-ethylbenzenesulfonyl fluoride
4-(diiodoacetyl)-2-propylbenzenesulfonyl azide
2-(bromoacetyl)-4-toluenesulfonyl azide
2-(dichloroacetyl)-4-toluenesulfonyl fluoride
2-(iodoacetyl)-4-butylbenzenesulfonyl fluoride
3-(dibromoacetyl)-2-hexylbenzenesulfonyl azide
4-(dichloroacetyl)-2-ter-butylbenzenesulfonyl fluoride
2-(chloroacetyl)-5-propylbenzenesulfonyl azide
3-(diiodoacetyl)-4-ethylbenzenesulfonyl azide
2-(dibromoacetyl)-4-methoxybenzenesulfonyl fluoride
2-(chloroacetyl)-4-ethoxybenzenesulfonyl azide
3-(diiodoacetyl)-2-butoxybenzenesulfonyl fluoride
3-(dichloroacetyl)-4-hexyloxybenzenesulfonyl azide
4-(bromoacetyl)-2-methoxybenzenesulfonyl fluoride
4-(dibromoacetyl)-3-butoxybenzenesulfonyl azide
2-(iodoacetyl)-5-ethoxybenzenesulfonyl fluoride
2-(dichloroacetyl)-5-bromobenzenesulfonyl azide

I claim:

1. A compound of the formula

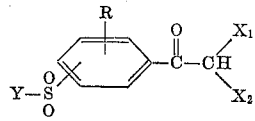

where R is a member of the class consisting of hydrogen, halogen, lower alkyl and lower alkoxy radicals, Y is an azido radical, $X_1$ is a halogen of the group consisting of chlorine, bromine and iodine, and $X_2$ is a member of the group consisting of hydrogen, chlorine, bromine and iodine.

2. p-(Bromoacetyl)benzenesulfonyl azide.
3. p-(Dibromoacetyl)benzenesulfonyl azide.
4. p-(Chloroacetyl)benzenesulfonyl azide.
5. p-(Dichloroacetyl)benzenesulfonyl azide.
6. o-(Bromoacetyl)benzenesulfonyl azide.
7. A process for the control of fungi comprising applying to matter subject to fungicidal attack a haloacetylarylsulfonyl azide as defined in claim 1.

References Cited in the file of this patent

OTHER REFERENCES

Kloosterzeil et al.: "Rec. Trav. Chim.," vol. 71, March 1952, p. 368.